W. B. WOOD.
Poisoned Artificial Jamestown Weed Flower for
Attracting and Destroying the Tobacco Fly.

No. 229,222. Patented June 22, 1880.

Witnesses:

Inventor
Wm. B. Wood.
Per C. A. Watson, Attorneys.

UNITED STATES PATENT OFFICE.

WILLIAM B. WOOD, OF FRANKLIN, KENTUCKY, ASSIGNOR OF ONE-HALF OF HIS RIGHT TO T. O. TOWNSEND, OF SAME PLACE.

POISONED ARTIFICIAL JAMESTOWN-WEED FLOWER FOR ATTRACTING AND DESTROYING THE TOBACCO-FLY.

SPECIFICATION forming part of Letters Patent No. 229,222, dated June 22, 1880.

Application filed February 16, 1880.

*To all whom it may concern:*

Be it known that I, WILLIAM B. WOOD, of Franklin, in the county of Simpson and State of Kentucky, have invented certain new and useful Improvements in Tobacco-Fly Exterminator or Artificial Jamestown-Bloom; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

This invention or discovery relates to exterminating the tobacco-fly; and it consists of an artificial flower, prepared in the manner as hereinafter more fully set forth.

Figure 1:
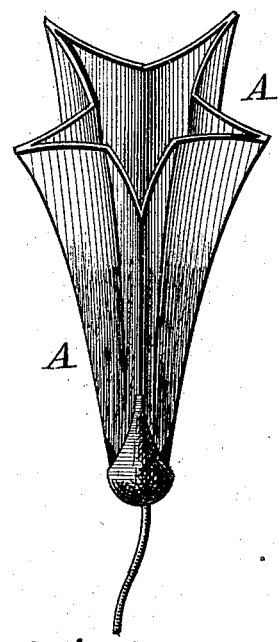
Figure 2:
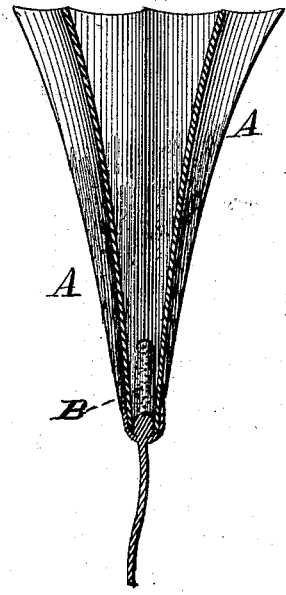

In the annexed drawings, Figure 1 is a perspective, and Fig. 2 is a central vertical section, of an artificial Jamestown-bloom.

I will now proceed to describe the best means known to me of carrying my discovery into effect.

A represents the petals, and B the filament and stamens, of the flower.

In order that the advantages of my discovery may be fully understood, I will proceed to describe its use.

The tobacco-fly makes its appearance in moderately small numbers in the month of May or June, depositing his eggs on early tobacco and tomato plants. The first hatchings (tobacco-worms) go into the ground, and come out in a few weeks tobacco-flies. The fly prefers the Jamestown to all other flowers.

The Jamestown does not bloom until July or August—not generally until August. It has a very nauseous and disgusting odor, which is imparted to the artificial flower by using the essence of Jamestown.' This may, however, be dispensed with.

The petals of the flower are made of glass, porcelain, or other suitable substance, and the part B is made of a mixture of cobalt poison and honey or sirup, made sufficiently thick for the purpose. The fly is also fond of other blooms, such as the lily, &c., which may also be used.

By this process I not only exterminate the early fly, but the artificial is superior to the natural bloom and can be used the whole season.

Having thus fully described my invention, what I claim as new, and desire to secure by Letters Patent, is—

An artificial Jamestown or other bloom having its filament and stamens composed of a poisonous mixture, for the extermination of the tobacco-fly, substantially as and for the purpose set forth.

In testimony that I claim the foregoing as my own I have hereto affixed my signature in presence of two witnesses.

WILLIAM BASIL WOOD.

Witnesses:
 G. W. WHITESIDES,
 TEST R. J. MALINE.